United States Patent [19]

Schmidt et al.

[11] 4,162,617

[45] Jul. 31, 1979

[54] PULSED CRYSTALLIZER WITH STRIPS OF REDUCED HEAT EXCHANGE

[76] Inventors: Paul Schmidt, Heinrich-Kampchenstr. 3, 4300 Essen 17; Peter Walzel, Brunnenstrasse 47, 4300 Essen 1, both of Fed. Rep. of Germany

[21] Appl. No.: 815,713

[22] Filed: Jul. 14, 1977

[30] Foreign Application Priority Data

Mar. 18, 1977 [DE] Fed. Rep. of Germany ....... 2711789
Mar. 18, 1976 [AT] Austria .................................. 2027/76

[51] Int. Cl.² .............................................. B01D 9/04
[52] U.S. Cl. ........................................ 62/123; 62/538; 62/543
[58] Field of Search ...................... 62/538, 532, 123

[56] References Cited

U.S. PATENT DOCUMENTS

| 3,266,263 | 8/1966 | Pollock | 62/533 |
| 3,395,547 | 8/1968 | Stoller | 62/538 |
| 3,411,309 | 11/1968 | Skrebowski et al. | 62/538 |

FOREIGN PATENT DOCUMENTS

321244  3/1975  Austria ..................................... 62/538

*Primary Examiner*—Norman Yudkoff
*Attorney, Agent, or Firm*—Robert R. Jackson; Charles B. Smith

[57] ABSTRACT

Selected chemical species in fluid media such as solutions, mixtures of liquids, and suspensions are crystallized by indirect cooling of the fluid media. Crystals are prevented from sticking to the heat exchange surface by pulsating the fluid with a component of pulsation parallel to the heat exchange surface. The crystals can then be separated from the residual fluid.

8 Claims, 9 Drawing Figures

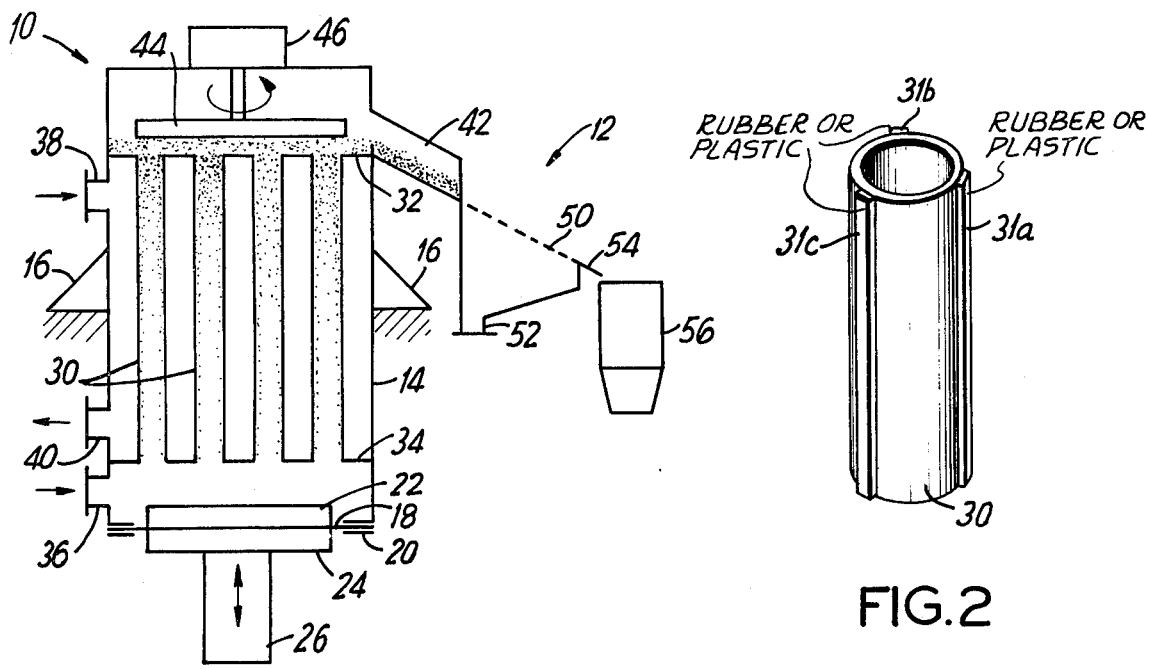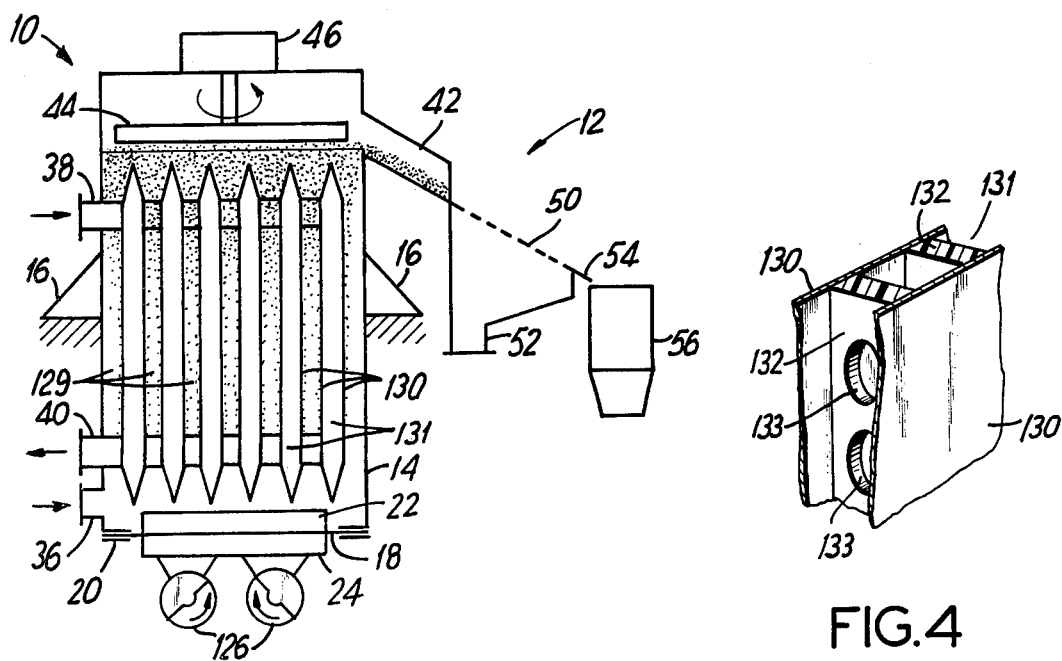

PULSED CRYSTALLIZER WITH STRIPS OF REDUCED HEAT EXCHANGE

BACKGROUND OF THE INVENTION

This invention relates to methods and apparatus for crystallizing chemical species out of a fluid medium such as a solution, a mixture of liquids, or a suspension by indirect cooling of the fluid medium. The crystals can then be separated from the residual fluid medium.

Crystallizable species can be removed from solutions, mixtures of liquids, or suspensions by cooling the fluid medium until crystals form and then separating the crystals from the residual fluid medium. The crystallizable species may be a solvent or a dissolved substance in a solution, or it may be one of the liquids in a mixture or suspension. In some cases, the fluid medium being processed may not be characterized as simply a solution, mixture, or suspension, but may have attributes of two or more of these categories (e.g., a solution or mixture with suspended solids). A precise characterization of the medium being processed is not essential to the invention, and the medium being processed will be referred to in general herein as the fluid whether it is a solution, mixture, suspension, or some combination of these. The residual fluid left by partial crystallization of a fluid will be referred to in general herein as the brine.

Chemical species are crystallized and separated from a fluid either to recover the crystallizable species, or to obtain a concentrated brine, or for both of these purposes. For example, pure water is produced from salt water by removing the solvent from the saline solution. Spent chemical process liquors are concentrated to facilitate reuse or disposal by removing all or a portion of the liquids from the spent liquor. For example, the spent liquor of the wood pulping process in papermaking and similar operations (e.g., the so-called black liquor) is concentrated in this way to allow the brine to burn as a source of energy and to permit recovery of the chemicals therein contained. Various food solutions, suspensions, etc., such as fruit juices, may be concentrated in this way to facilitate handling and further processing.

Austrian Pat. No. 321,244 describes methods and apparatus for removing crystallizable solvents from solutions by indirect cooling of the solution to form crystals of the solvent, followed by mechanical separation of the crystals from the brine. As described in that patent, heat exchange surfaces between the coolant and the solution are vibrated with a component of motion in the plane of those surfaces so that crystals which form on those surfaces are continually broken off and flushed with the brine. This prevents the formation of a continuous layer of crystals adhering to the heat exchange surfaces. Such a layer would reduce the rate of heat transfer between the coolant and the solution, and would have to be removed, e.g., by means of mechanical scrapers. Elimination of srapers greatly simplifies the freezing apparatus and makes it possible to construct such apparatus with much greater heat transfer area per unit volume, e.g., by using many small, closely spaced, parallel heat exchange tubes. Vibration of the heat exchange surfaces also increases the rate of heat transfer between the coolant and the solution by producing turbulence in the coolant and the solution near the heat exchange surfaces.

A possible disadvantage of vibrating the heat exchange surfaces as described above is that a relatively large amount of energy may be required to vibrate the relatively massive structure of the heat exchanger. Vibration of the heat exchanger also subjects it to mechanical stresses which may require it to be more massive than would otherwise be necessary, and which may result in wear and failure of the structure, e.g., as a result of fatigue.

In view of the foregoing, it is an object of this invention to provide improved methods and apparatus for crystallizing chemical species from solutions, mixtures, and suspensions by indirect cooling of the fluid. The crystals can then be separated from the brine.

SUMMARY OF THE INVENTION

This and other objects of the invention are accomplished in accordance with the principles of the invention by pulsating the fluid so that it flows rapidly back and forth along the heat exchange surfaces. Crystals are prevented from sticking to the heat exchange surfaces by the motion of the fluid. The surfaces themselves can now be kept fixed. The crystals can be separated from the brine by a variety of means such as flotation, screening, filtration, centrifugation or the like.

The direction of pulsation of the fluid preferably has an inclination between 0° and about 30° to the heat exchange surfaces in the crystallizing apparatus of the invention. This increases the efficiency of the pulsation in preventing the crystals from sticking to the heat exchange surfaces and helps prevent accumulation of crystals anywhere on those surfaces.

The heat exchange surfaces in the crystallizing apparatus of the invention also preferably have zones of reduced heat transfer substantially parallel to the direction of pulsation of the fluid. This helps to prevent crystals from sticking to the heat exchange surfaces by preventing the formation of extensive crystal structures on those surfaces.

The heat exchange surfaces are preferably smooth and free of sharp edges. This promotes uniform heat transfer and reduces the tendency of crystals to stick to the heat exchange surfaces.

Fins may be provided projecting into the fluid from the heat exchange surface transverse to the component of pulsation which is parallel to the heat exchange surface to produce additional turbulence in the fluid. A zone of reduced heat transfer is provided adjacent each such fin to prevent crystals from sticking to the heat exchange surface in the low shear regions produced near the fin.

Further features of the invention, its nature and various advantages will be more apparent from the accompanying drawing and the following detailed description.

BRIEF DESCRIPTION OF THE DRAWING

FIG. 1 is a simplified elevational view, partly in section, of apparatus constructed in accordance with the principles of this invention which can be used for carrying out the methods of the invention;

FIG. 2 is a perspective view showing how a portion of the apparatus of FIG. 1 may be constructed in accordance with the principles of the invention;

FIG. 3 is similar to FIG. 1 and shows an alternative embodiment of the apparatus of the invention which can be used for carrying out the methods of the invention;

FIG. 4 is a perspective view showing how a portion of the apparatus of FIG. 3 may be constructed in accordance with the principles of the invention;

DETAILED DESCRIPTION OF THE INVENTION 70

Figure 5:
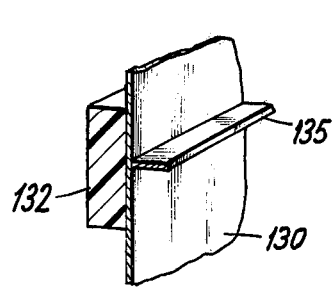
FIG. 5 is a perspective view showing how the apparatus of FIG. 4 may be modified in accordance with the principles of the invention.

The methods and apparatus of this invention are suitable for removing any of a wide variety of crystallizable species from solutions, mixtures, suspensions, and the like to recover the crystallizable species, to concentrate the brine, or for both of these purposes. The examples mentioned above (production of pure water from salt water solutions, concentration of black liquor from wood pulping processes, and concentration of food solutions such as fruit juices) are illustrative of the applications of the methods and apparatus of this invention. Other examples include concentration of aqueous acids, crystallization of ortho-xylene out of a solution of para-xylene and ortho-xylene, and the like.

The invention is applicable to both continuous and batch processing. Moreover, in either of these modes, fluids can be processed in which the density of the crystals has any relationship to the density of the brine. In the ensuing discussion, it will be assumed (unless other conditions are stated) that the fluid being processed has a specific gravity greater than that of the crystals, and that the crystals therefore tend to rise in the crystallizer.

As shown in FIG. 1, apparatus constructed in accordance with the principles of this invention includes vertically disposed crystallizer 10 and means 12 for separating the crystals produced by crystallizer 10 from the brine. The apparatus shown in FIG. 1 is best suited for processing fluids in which the crystals have a lower specific gravity than the brine. This is true, for example, for most aqueous solutions, mixtures, and suspensions wherein water is to be crystallized as ice. In processing such fluids, the crystals tend to rise to the top of crystallizer 10 and a slurry of crystals in brine can be skimmed off the top of the crystallizer for separation in separator 12.

If desired, the apparatus of FIG. 1 can be modified by eliminating the slurry outlet at the top and providing instead a drain at the bottom for processing fluids for which the specific gravity of the crystals is greater than that of the brine. Apparatus of this type is discussed in greater detail in connection with FIG. 6.

Returning to the particular embodiment shown in FIG. 1, crystallizer 10 includes a vertical, preferably cylindrical housing 14 which is held rigidly by supports 16. Housing 16 is shown cut away in FIG. 1 to reveal the interior of the apparatus. The bottom of housing 14 is covered by flexible diaphragm 18 which can be made of any suitable material such as fiberglass-reinforced rubber. The periphery of diaphragm 18 is clamped against the bottom margin of housing 14 by retaining ring 20 to seal the bottom of housing 14.

The central portion of diaphragm 18 is clamped between substantially rigid plates 22 and 24. Plates 22 and 24 are connected to vibrator 26 which vertically reciprocates plates 22 and 24 at any desired frequency and amplitude. The vertical vibration of plates 22 and 24 vertically pulsates the fluid in crystallizer 10 as is described in greater detail below. The appropriate frequency of vibration of plates 22 and 24 (controlling the frequency of pulsation of the fluid) may depend on the size and other characteristics of the apparatus and on the fluid being processed. Typically, the frequency of vibration ranges between 0.5 and 200 Hz, and preferably between 10 and 60 Hz. The amplitude of vibration may also depend on the size and other characteristics of the apparatus and on the fluid being processed. Typically, the amplitude of vibration is between 0.5 and 2 mm.

Any suitable vibrator can be used for vibrating plates 22 and 24. For example, if relatively low frequency vibration (say 10 Hz or below) is required, vibrator 26 can be any of several types of mechanical vibrators. For frequencies between 30 and 200 Hz, electromagnetic vibrators may be preferable.

Inside housing 14, a plurality of vertical cylindrical tubes 30 (also shown cut away to reveal their interiors) extends between upper and lower separator plates 32 and 34. Separator plates 32 and 34 are mounted transversely in housing 14, and the ends of tubes 30 are fitted into apertures in plates 32 and 34. The bottom of plate 34 may be shaped to promote smooth transfer of the pulsation into tubes 30. The structure including separator plates 32 and 34 and tubes 30 is sealed so that the fluid being processed and the coolant do not mix. The diameter of tubes 30 and the spacing between the tubes is typically in the range from about 10 to 50 mm.

The fluid to be processed is introduced into crystallizer 10 via inlet 36 near the bottom of housing 14 below separator plate 34. Preferably, the fluid has been previously cooled to a temperature near that at which crystallization starts. The principles discussed in the above-mentioned Austrian Pat. No. 321,244 can be applied to precooling the fluid in a thermally efficient manner. A coolant enters crystallizer 10 via inlet 38 below separator plate 32 and fills the space between plates 32 and 34 surrounding tubes 30. The coolant introduced into crystallizer 10 is at a temperature below that of incipient crystallization. Spent coolant exits from crystallizer 10 via outlet 40. The direction of coolant flow may be reversed if desired.

Inside crystallizer 10, the fluid being processed flows upward from the enclosed lower reservoir below separator plate 34 through tubes 30 to the upper reservoir above separator plate 32. The fluid in tubes 30 is cooled by heat transfer through the walls of tubes 30 to the coolant surrounding the tubes. As a result of this cooling, crystals form in the fluid in tubes 30, particularly near or on the inside surfaces of tubes 30. The fluid in tubes 30 is pulsated vertically by vibrator 26 and associated apparatus. This pulsation of the fluid in tubes 30 prevents the crystals forming in the fluid from sticking to the inside surfaces of tubes 30. The pulsation of the fluid may prevent the crystals from forming on the inside surfaces of the tubes, or if some crystals do form on those surfaces, the pulsation of the fluid strips the crystals from the tube surfaces and causes the crystals to re-enter the fluid flow in the tubes. The principal mechanism by which the crystals are thus stripped from the inside surfaces of tubes 30 is the rapid up and down flow of fluid and previously formed crystals adjacent the walls of tubes 30 as the fluid pulsates. This rapid motion of the fluid and of previously formed crystals shears the crystals off the inside surfaces of the tubes as they form. Because the inside surfaces of tubes 30 are kept substantially free of crystals, heat transfer between the fluid and the coolant is not impeded by a layer of crystals on the heat exchange surfaces. The turbulence produced in the fluid by pulsation also improves heat transfer between the fluid and the coolant.

Because the specific gravity of the crystallized species is assumed to be less than that of the brine and because of the upward flow in tubes 30, the proportion of crystals in the fluid and the concentration of the brine increase toward the top of tubes 30. At the top of tubes 30 the brine and crystals may form a thick slurry. Typically, the fluid is concentrated in the range from about 6% to about 70%.

The fluid at the top of tubes 30 above separator plate 32 is skimmed off, removing a slurry of brine and crystals via outlet 42. In the particular embodiment shown in FIG. 1, the liquid is swept by blade 44 which is rotated by motor 46.

The crystals and brine exiting from crystallizer 10 are separated in separator 12. In the particular embodiment of separator 12 shown in FIG. 1, the slurry exiting from the crystallizer is first strained by screen or filter 50. Most of the brine passes through screen 50 and is collected below at outlet 52. The crystals pass over screen 50 and exit via chute 54. Improved separation may be achieved by washing the material as it passes over screen 50. Centrifuge 56 may be provided to remove additional liquid from the crystals exiting by way of chute 54. If desired, the material exiting via outlet 42 may first be processed in a ripening tank (not shown) in which the crystals produced in crystallizer 10 grow and/or combine to form larger crystals which are more easily separated from the brime by screening, filtration, and the like.

If desired, countercurrent flow of crystals and brine can be obtained in the apparatus of FIG. 1 by introducing the fluid at the top of crystallizer 10 and removing the brine from the bottom. The crystals are removed at the top of the crystallizer as shown in FIG. 1.

In accordance with the principles of this invention, the heat exchange surfaces in the crystallizing apparatus preferably have an inclination between 0° and about 30° to the direction of pulsation of the fluid to assure that a major component of the pulsating motion is parallel to the heat exchange surfaces. This assures the efficient use of the energy required to pulsate the fluid for the intended purpose of preventing crystals from sticking to the heat exchange surfaces. In the particular embodiment shown in FIG. 1, vibrator 26 reciprocates plates 22 and 24 vertically so that the fluid in vertical tubes 30 pulsates substantially parallel to all portions of the inside surfaces of tubes 30.

The heat exchange structures in crystallizing apparatus constructed in accordance with this invention are also preferably constructed with smooth surfaces and no sharp edges which would interfere with uniform heat transfer, create areas sheltered from the pulsating flow of fluid, or permit excessive adherence of crystals to the heat exchange structure. However, the heat exchange surface need not be planar but may be corrugated, rippled, dimpled, or the like to increase the efficiency of the heat exchange. As used herein, the term corrugated heat exchange surface means any of these types of smooth but nonplanar heat exchange surfaces.

FIG. 2 shows how a typical tube 30 in the apparatus of FIG. 1 can optionally be constructed in accordance with the invention to provide zones of low or reduced heat transfer substantially parallel to the direction of pulsation to help prevent sticking of crystals to the inside surface of the tube. As shown in FIG. 2, one or more longitudinal strips 31a, 31b, 31c are bonded or otherwise attached to the outer surface of tube 30. Strips 31 are preferably a material of low or reduced thermal conductivity as compared to the material of tube 30. For example, strips 31 may be a rubber or plastic material such as Teflon. Strips 31 reduce or substantially prevent the formation of crystals on the adjacent portions of the inside surface of tube 30 by reducing heat transfer from those portions of the surface. Accordingly, the size of the crystals forming on the remaining inside surface of tube 30, particularly the tube surface area over which those crystals extend, is limited. In other words, strips 31 prevent the formation of large continuous crystal structures on the tube surface. This promotes release of crystals from the tube surface.

Strips 31 are particularly desirable when the heat exchange surfaces are tubes with the fluid on the inside as in FIG. 1. In that case, strips 31 prevent the formation of collars of crystals around the inside of a tube. Once formed, the arch strength of such collars can make them particularly resistant to release. They then occlude, and may even completely block the tube.

Strips 31 do reduce the efficiency of the associated heat exchange surfaces. Strips 31 are therefore preferably no wider or more numerous than is required to help reduce the sticking of crystals as described above.

Although in the embodiment shown in FIG. 2, zones of low heat transfer are provided by means of strips 31 on the outer surface of tube 30, it will be understood that such zones can be provided in other ways. For example, the thickness of the heat exchange surface can be varied without changing the material of that surface. Alternatively, the surface can be made of alternating strips of differing thermal conductivity. Strips can also be placed on the side of the heat exchange surface in contact with the fluid being processed, provided they are of a material to which the crystals do not stick.

FIG. 3 shows an alternative embodiment of the apparatus of this invention employing an evaporator plate heat exchanger and eccentric vibrators for pulsating the fluid to be processed. In other respects, the apparatus of FIG. 3 is similar to the apparatus of FIG. 1.

In the apparatus of FIG. 3, the fluid to be processed enters the apparatus via inlet 36 and fills the spaces 129 between vertically disposed evaporator plates 130. Coolant (in this case a refrigerant) enters the apparatus via inlet 38, fills the remaining spaces 131 between evaporator plates 130, and exits via outlet 40. The direction of coolant or fluid flow may be reversed if desired. The fluid in spaces 129 is pulsated by eccentric vibrators 126 which vertically reciprocate plates 22 and 24 as in the apparatus of FIG. 1. The fluid is pulsated substantially parallel to the surfaces of plates 130 so that crystals are prevented from sticking to those surfaces by the rapid back and forth motion of the fluid which breaks off any crystals forming on those sufaces. A slurry of crystals in brine exits via outlet 42 as in the apparatus of FIG. 1. The remainder of the apparatus of FIG. 3 for separating the crystals from the brine may be the same as in FIG. 1.

FIG. 4 shows how the apparatus of FIG. 3 can be constructed to provide zones of reduced heat transfer parallel to the direction of pulsation similar to the zones of reduced heat transfer provided by strips 31 in FIG. 2. Vertically disposed longitudinal spacer members 132 extend at regular intervals between adjacent evaporator plates in the space 131 otherwise occupied by refrigerant. Spacer members 132 are preferably made of a material of relatively low thermal conductivity as compared to the material of evaporator plates 130. Spacer members 132 reduce the rate of heat transfer through the adjacent portions of evaporator plates 130. Accordingly, crystals do not form on the portions of evaporator plates 130 opposite spacer members 132. Spacer members 132 therefore perform the same function as strips 31 in FIG. 2, limiting the size of the crystal structures forming on the heat exchange surfaces and facilitating their removal from those surfaces. Separator members 132 also stiffen evaporator plates 130 against dynamic pressure variations produced by pulsating the fluid being processed. Apertures 133 in separator members 132 promote circulation of refrigerant throughout space 131.

If desired, fins 135 may be attached to the heat exchange surfaces transverse to the component of pulsation which is parallel to the heat exchange surface to produce additional turbulence in the fluid as shown in FIG. 5. A zone of reduced heat transfer is provided adjacent each such fin (e.g., by attaching a strip of low thermal conductivity material 132 to the heat exchange surface opposite the fin) to prevent crystals from sticking to the heat exchange surface in low shear regions produced near the fin.

Figure 6:
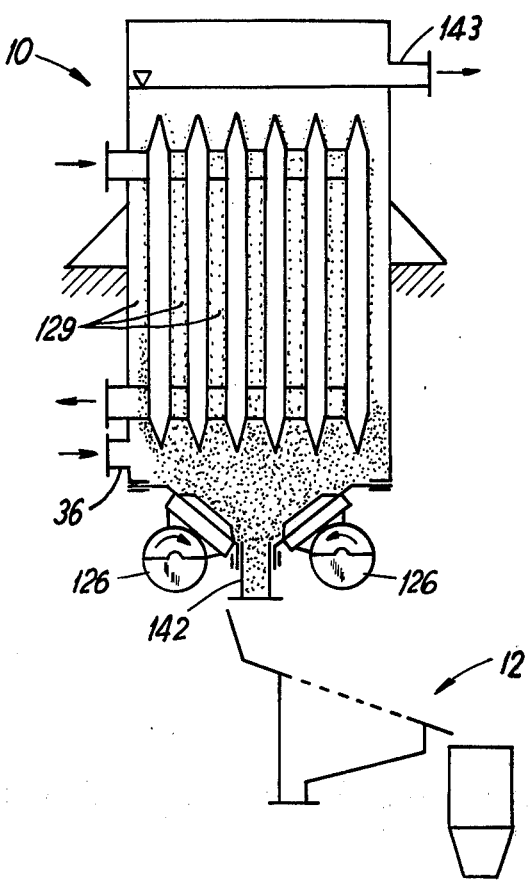
FIG. 6 is similar to FIG. 3 and shows a further alternative embodiment of the apparatus of the invention which can be used for carrying out the methods of the invention.

FIG. 6 shows how the apparatus of FIG. 3 may be modified to permit extraction of the brine and crystals from the bottom of crystallizer 10. This modification of the apparatus may be desirable for processing fluids in which the crystals have a specific gravity greater than that of the brine and in which the crystals therefore tend to sink in the crystallizer 10.

In most respects, the embodiment of FIG. 6 is similar to the embodiment of FIG. 3. Fluid to be processed enters crystallizer 10 via inlet 36 and flows generally upward in the apparatus. The flow of coolant is the same as in FIG. 3. Crystals form in spaces 120 and tend to descend toward the bottom of the crystallizer. The fluid in the crystallizer is pulsated by vibrators 126 with diaphragms similar to those of FIG. 3. The vibrators are angled slightly toward each other and operated in a phase relationship such that the horizontal components of motion essentially cancel. Thus, the fluid is pulsated substantially in the vertical direction. A slurry of crystals in brine exits from crystallizer 10 via outlet 142 between vibrators 126. Excess brine may exit from the top of crystallizer 10 via exit 143. Separator apparatus 12 similar to that shown in FIG. 3 may be provided for separating the crystals from the brine which drains via outlet 142. If desired, the direction of fluid flow can be reversed in the apparatus of FIG. 6.

Figure 7:
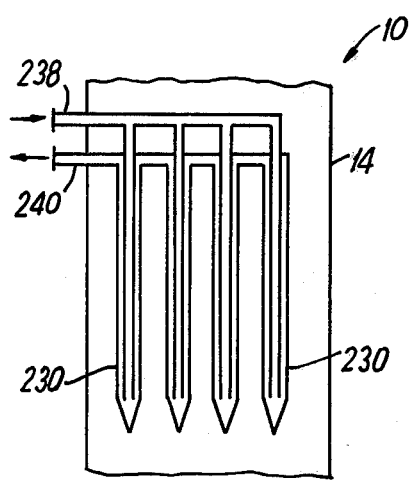
FIG. 7 is similar to a portion of FIGS. 1, 3, and 6 and shows a further alternative embodiment of a portion of the apparatus of the invention which can be used for carrying out the methods of the invention.

FIG. 7 shows how the crystallizer apparatus of the preceding figures can be modified to include a field tube type heat exchanger. FIG. 7 shows only the central portion of crystallizer 10. The upper and lower portions of the crystallizer which are not shown in FIG. 7 can be constructed as shown in any of the preceding figures.

In FIG. 7, crystallizer 10 includes housing 14 which is cut away as in the earlier figures. A plurality of vertically disposed field tubes 230 is mounted inside housing 14. Each of the field tubes visible in FIG. 7 is shown cut away to reveal its interior. Each of field tubes 230 includes concentric inner and outer tubes which are in communication near the bottom of the field tube. Coolant is introduced into the apparatus via inlet 238 and distributed to all the inner tubes in the field tubes. The coolant flows down the inner tubes and then up outside the inner tubes but within the outer tubes. The spent coolant is collected from all the field tubes and exits via outlet 240. The direction of coolant flow may be reversed if desired. The fluid being processed surrounds field tubes 230 and is pulsated vertically to prevent crystals forming in the liquid from sticking to the field tubes. In this embodiment, the coolant is therefore inside the heat exchange tubes and the liquid being processed is outside the heat exchange tubes.

Figure 8:
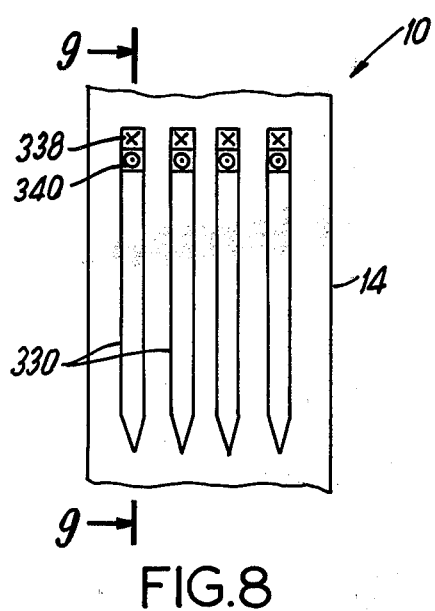
FIG. 8 is similar to a portion of FIGS. 1, 3, and 6 and shows still another alternative embodiment of a portion of the apparatus of the invention which can be used for carrying out the methods of the invention.
Figure 9:
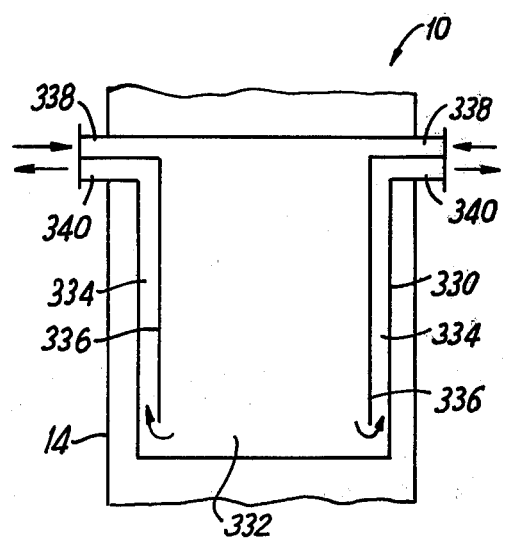
FIG. 9 is a sectional view of the apparatus of FIG. 8 taken along the line 9—9.

FIGS. 8 and 9 show how the crystallizer apparatus of any of the preceding figures can be modified to include a plate heat exchanger similar to a field tube type heat exchanger. As in the case of FIG. 7, only the central portion of crystallizer 10 is shown in FIGS. 8 and 9, the upper and lower portions of the crystallizer which are not shown in FIGS. 8 and 9 can be constructed as shown in any of the preceding figures.

In FIGS. 8 and 9, crystallizer 10 includes housing 14 and a plurality of vertically disposed, field plate heat exchange enclosures 330. Housing 14 and field plate heat exchange enclosures 330 are cut away to reveal their interiors. Each of heat exchange enclosures 330 includes a central portion 332 which is partially separated from the remaining outer portions 334 by transverse separator plates 336. The central and outer portions of the enclosure are in communication near the bottom of the enclosure below separator plates 336. Coolant enters each of heat exchange enclosures 330 via opposite inlets 338 and flows down in the central portion of the enclosure. At the bottom of the enclosure, the coolant enters the outer portions of the enclosure, flows upward and exits via outlets 340. The direction of coolant flow may be reversed if desired. The liquid to be processed is outside the field plate heat exchange enclosures and is pulsated vertically as in the previous embodiments to prevent crystals from sticking to the heat exchange surfaces.

It will be understood that the embodiments shown and described herein are illustrative of the principles of this invention only, and that various modifications can be implemented by those skilled in the art without departing from the scope and spirit of the invention. For example, various types of vibrating systems can be used to pulsate the fluid as described above.

We claim:

1. Apparatus for crystallizing chemical species in a fluid comprising a fixedly mounted heat exchange surface for cooling the fluid to cause crystals to form in the fluid and means for pulsating the fluid at a frequency between 0.5 and 200 Hz with a component of pulsation parallel to the heat exchange surface having amplitude at least 0.5 mm to prevent any crystals from forming on the heat exchange surface, the heat exchange surface including a plurality of longitudinal, laterally spaced zones of reduced heat transfer substantially parallel to the direction of pulsation of the fluid to prevent crystals from forming in the fluid adjacent the zones of reduced heat transfer.

2. The apparatus defined in claim 1 wherein each zone of reduced heat transfer is formed by a strip of material of reduced thermal conductivity on the opposite side of the heat exchange surface from the fluid.

3. The apparatus defined in claim 1 further comprising fins projecting from the heat exchange surface into the fluid transverse to the component of pulsation of the fluid which is parallel to the heat exchange surface to produce turbulence in the fluid adjacent the heat exchange surface.

4. The apparatus defined in claim 3 wherein the heat exchange surface has a zone of reduced heat transfer adjacent each fin to prevent crystals from forming in the fluid adjacent each fin.

5. The apparatus defined in claim 1 wherein the heat exchange surface comprises a plurality of vertical tubes extending from an enclosed lower reservoir to an upper reservoir, the lower reservoir, the tubes, and at least part of the upper reservoir containing the fluid; wherein a cooling medium surrounds the outer surface of the tubes; wherein the means for pulsating the fluid vertically reciprocates at least a portion of the bottom of the lower reservoir beneath the tubes to cause vertical pulsation of the fluid in the tubes; and wherein the zones of reduced heat transfer comprise a plurality of longitudinal, circumferentially spaced zones of reduced heat transfer associated with each of the tubes and extending parallel to the longitudinal axis of the associated tube.

6. The apparatus defined in claim 5 wherein each zone of reduced heat transfer is formed by a strip of material of reduced thermal conductivity on the outside surface of the tube.

7. The apparatus defined in claim 1 wherein the heat exchange surface comprises a plurality of vertical plates extending from an enclosed lower reservoir to an upper reservoir, adjacent pairs of the plates forming portions of an enclosure for a cooling medium, and the lower reservoir, the space between the plates outside the cooling medium enclosure, and at least part of the upper reservoir containing the fluid; wherein the means for pulsating the fluid vertically reciprocates at least a portion of the bottom of the lower reservoir beneath the plates to cause vertical pulsation of the fluid between the plates outside the cooling medium enclosure; and wherein the zones of reduced heat transfer comprise a plurality of longitudinal, vertically aligned, laterally spaced zones of reduced heat transfer associated with each plate.

8. The apparatus defined in claim 7 wherein the zones of reduced heat transfer are formed by vertically disposed members of reduced thermal conductivity extending between adjacent pairs of the plates within the cooling medium enclosure.

* * * * *